Figure 1:
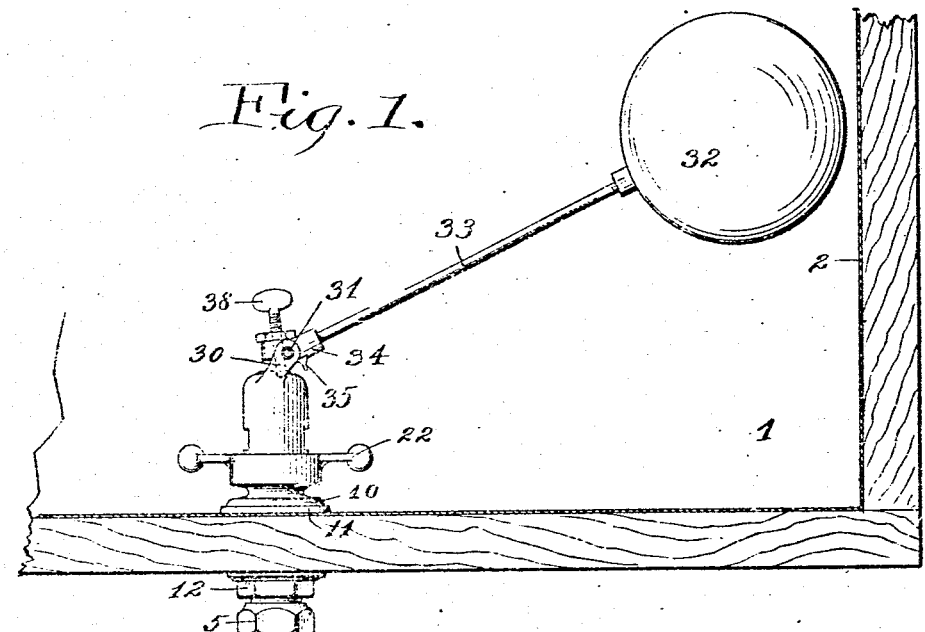

G. E. VAN DEUSEN.
BALL COCK.
APPLICATION FILED JULY 22, 1907.

948,748.

Patented Feb. 8, 1910.

Witnesses
E. B. Gilchrist
Brennan West?
A. L. Lord

Inventor
George E. Van Deusen
By Bates, Fouts & Hull,
Attorneys

UNITED STATES PATENT OFFICE.

GEORGE E. VAN DEUSEN, OF CLEVELAND, OHIO, ASSIGNOR TO WILLIAM A. VAN DEUSEN, OF CLEVELAND, OHIO.

BALL-COCK.

948,748.   Specification of Letters Patent.   Patented Feb. 8, 1910.

Application filed July 22, 1907. Serial No. 384,851.

*To all whom it may concern:*

Be it known that I, GEORGE E. VAN DEUSEN, a citizen of the United States, residing at Cleveland, in the county of Cuyahoga and State of Ohio, have invented a certain new and useful Improvement in Ball-Cocks, of which the following is a full, clear, and exact description, reference being had to the accompanying drawings.

This invention relates to ball cocks or float valves of the type which are employed in flushing tanks for the purpose of automatically cutting-off the supply of liquid to such tanks when the liquid has reached a predetermined level therein.

It has for its objects to provide a cock of this type with a double or reversible plug or valve body having at both ends means for forming an effective cut-off with its seat; also to provide for cocks of this type an efficient union which is located inside of the tank, whereby any leakage at said union will be confined entirely within the tank; also to provide a union which while located within the tank, can be disconnected without the necessity of the employment of tools which, owing to the inconvenient location of the flushing tanks and the limited space provided therein, are often extremely difficult of application; to provide connections between the ball or float and the plug which will permit the employment of a small ball and a short connecting rod and which, when the ball rises to its upper limit of movement and thereby shortens the effective length of the lever rod by which the ball is supported, will give a greatly increased leverage in the short arm of the lever which acts upon the valve plug and enable it, at the extreme lift of the float, to exert a locking action on said plug; to provide the valve with means which shall permit of the free flow of liquid therethrough; also to provide a water-packed joint for the valve plug.

A further object of the invention is to provide a construction of valve or cock which may be conveniently assembled, which will be free from "fluttering" or other objectionable noise and which will permit the rod or lever by which the ball is carried to be permanently connected to its pivotal support or fulcrum.

Generally speaking, the invention may be defined as consisting of the combinations of elements embodied in the claims hereto annexed and illustrated in the drawings forming part hereof, wherein—

Figures 2, 3, 4:
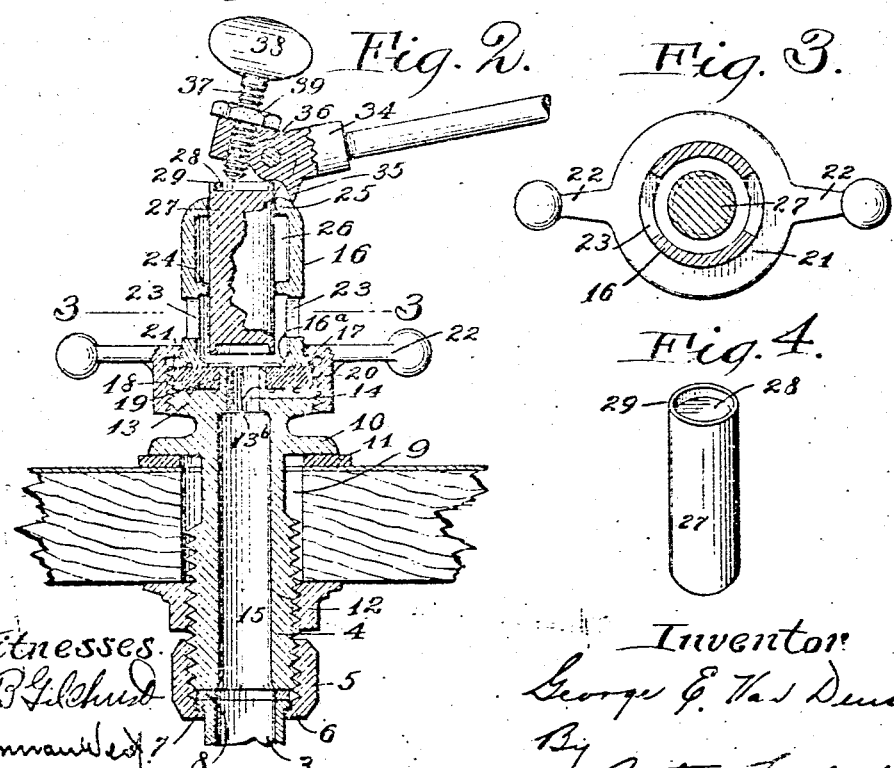

Figure 1 represents a side elevation of a ball cock and connections constructed in accordance with my invention, a portion of the tank being shown in section. Fig. 2 represents an enlarged sectional view of the cock or valve and the connections between the same and the bottom of the tank. Fig. 3 represents a sectional view on the correspondingly-numbered line of Fig. 2 and Fig. 4 represents a perspective detail of the plug or valve body.

Describing the parts by reference characters, 1 represents a tank of any approved construction, the same being shown as a wooden tank provided with a sheet-metal lining 2.

3 denotes the supply pipe by means of which liquid is supplied to the interior of the tank. The upper end of supply pipe 3 is connected to the lower end of an inlet connection sleeve or union 4 by means of a gland nut 5 having a shoulder 6 adapted to engage a flange 7 on the upper end of pipe 3 and provided with an internal thread by means of which it may be adjusted along the threaded exterior of connection 4. A washer 8 is interposed between the upper end of pipe 3 and connection 4. This connection is inserted through the aperture 9 in the bottom of the tank and is provided with a flange 10 above and of greater diameter than said aperture, said flange resting upon a washer 11. By means of a clamp nut 12, connection 4 may be drawn downwardly to provide a tight fit between flange 10 and washer 11 and prevent leakage through the aperture 9. The upper end of connection 4 is also provided with a flange 13 provided on its exterior with a screw thread and having a central bore 14 therethrough of smaller diameter than the main bore 15 of said connection.

To the upper end of connection 4 my valve is applied, said valve comprising a sleeve or casing 16 which is detachably secured to the upper end of said connection. This sleeve or casing comprises a tubular body having at the lower end thereof a flange 17 by means of which the lower end of said sleeve or casing is clamped upon the washer 18, said washer resting on top of the upper end of connection 4 and being provided with a central bore 19 adapted to receive a flange or short tubular extension 13ᵇ of flange 13 whereby the washer is centered and the access of water beneath the same is prevented, thereby preventing fluttering of the washer. To further prevent this fluttering action, the bottom of the sleeve or casing 16 is flanged inwardly at 16ª, reducing the free area of the washer between the bottom of the sleeve or casing and the center thereof.

To secure the sleeve or casing on top of connection 4, I employ a gland nut or union 20 comprising a depending interiorly threaded sleeve adapted to be screwed upon the external thread of flange 12 and provided with an inwardly projecting shoulder or flange 21 adapted to engage flange 17 and firmly clamp the sleeve or casing 16 against the washer 18. For the purpose of operating the gland nut or union 20 without the necessity of the employment of a wrench or other tool, said nut is provided with a pair of operating arms 22, preferably cast therewith and projecting in opposite directions therefrom. At a short distance above flange 17, casing or sleeve 16 is provided with a pair of oppositely located ports 23, forming a free and unobstructed passageway for the water supplied to the tank through connection 15. Above said ports, casing 16 is provided with an inwardly projecting annular flange 24 and at the top with a flange or shoulder 25, said flanges being of the same internal diameter, a chamber 26 being provided between said flanges. Within the sleeve or casing 16 there is fitted a valve body or plug 27. This plug is of cylindrical shape and the diameter thereof is substantially equal to the internal diameter of flanges 24 and 25, which, with the chamber 26, form a water-packed joint for said plug. This plug is symmetrical throughout its extent and is provided at each end with a circular recess 28 surrounded by a narrow flange or ring 29 which is formed by the projecting end of the plug. This construction of the valve plug enables it to be reversed when the end which has been in engagement with the valve seat becomes worn and so gives double the life of the ordinary plug. This ring is of greater diameter than the aperture 19 in washer 18 and forms a ring seat with said washer which effectively shuts off communication between the connection 4 and the interior of the tank when the plug is seated.

The sleeve or casing 16 is provided with a pair of inclined arms or lugs 30 projecting upwardly from the upper central portion thereof. The upper ends of these lugs are provided with apertures for the reception of the pivot 31 of the ball rod. Owing to the inclination of lugs 30, these apertures are at one side of the axis of the casing 16, as will appear more particularly from an inspection of Fig. 2. 32 denotes the ball or float by means of which the valve is closed when the water in the tank reaches its predetermined level. This ball may be threaded onto a rod 33, the lower end of said rod being threaded into a connection 34. This connection is provided with a downwardly projecting lug 35 which is adapted to engage the top of the casing or sleeve 16 and thus form a stop for limiting the fall of the ball and the opening movement of the valve plug. Connection 34 is provided with an aperture for the reception of the pivot 31, said pivot being preferably a rivet which extends through the apertures in the lugs 30 and forms a pivotal connection between the ball and said lugs. Connection 34 comprises two portions which are arranged at an angle with respect to each other. The rear portion 36 projects beyond the pivot and is provided with a threaded aperture for the reception of an adjusting screw 37, the lower end of which is adapted to engage the upper end of the valve plug 27 within the recess and at about the central portion thereof, the upper end being provided with an operating handle or finger piece 38. A lock nut 39 is applied to screw 38, whereby said screw may be secured in adjusted position.

It will be seen that rod 33 and connection 34 constitute a lever of the first class whereby the valve plug 27 may be operated by the ball 32, the arms of the lever being offset or arranged at an angle with respect to each other.

It will be apparent from the foregoing description, that the joint or union between the supply and the valve casing is located entirely within the tank and that the valve may be connected to or disconnected from the supply by merely manipulating the gland nut or union 20 by the operating handles or arms thereof. The joint between the valve and the supply is located where, should any leakage occur, no injury will be done to the house or apartment within which the tank is located, while the joint is easily accessible and may be conveniently and quickly connected and disconnected for the purpose of inspection and repair, particularly for the insertion of a new washer in place of washer 18. Furthermore, by merely slacking up the gland nut or union 20, the ball lever and valve casing may be turned to any desired position, enabling the ball and its rod to be turned toward a corner of the tank where insufficient room is provided between the connection and the end or side of the tank for the accommodation of the ball and rod.

In operation, suppose the liquid to be drawn from the tank through the flushing-pipe. The ball 32 drops and the lower end of screw 37 is thereby elevated. The pressure of the water from below lifts the valve plug 27 and water flows freely through the large ports 23, located adjacent to the aperture 19, the movement of the plug within the casing or sleeve 16 being facilitated by the water-packed joint formed by and between flanges 24 and 25. Owing to the shape of the connection 34, the location of the pivotal connection between the same and lugs 30 and the location of screw 37, as the float rises the lower end of the screw approaches a line drawn through the pivot of the lever, the cavity in the top of the plug facilitating this action. As the ball approaches the upper limit of its movement, a short lever arm is provided between the pivot of the lever and the lower end of 37, the effective length of this lever decreasing faster than the decrease in the effective length of the lever interposed between the ball 32 and the pivot. In this manner an increasing leverage is exerted by the ball and its rod upon the top of the valve plug as the ball rises and, at the upper limit of movement of the ball, a locking action is exerted upon the top of the plug, as will appear from Fig. 1.

My construction permits of great convenience in assembling the valve. Owing to the fact that the plug may be inserted from the bottom of the sleeve or casing 16, the ball lever may be permanently connected to the lugs 30, as by the rivet 36. The union sleeve or gland nut 20 may be slipped over the upper end of rod 33 and over casing 16 before the ball 32 is threaded or otherwise secured to the end of said rod.

The particular construction of the plug not only forms a very efficient joint between the bottom thereof and the top of the washer 18, but, owing to the reversibility of the plug, the life of the valve is doubled.

Having described my invention, I claim:

1. The combination, with a tank, of a supply connection projecting thereinto and provided with a seat, a valve casing carried by said connection, a reciprocating plug in said casing, said plug having opposite ends thereof provided with symmetrical recesses, and lever mechanism adapted to engage the recess in the end remote from the valve seat, substantially as specified.

2. The combination, with a tank, of a supply connection projecting thereinto and provided at its inner end with a valve seat, a valve casing, a reciprocable plug in said casing having at each end thereof an annular projecting flange adapted to form a cut-off with the valve seat, a float lever adapted to engage the recess within the projecting flange at the end of the plug remote from the valve seat, and means for connecting said casing to said supply connection.

3. The combination with a tank, of a supply connection projecting thereinto and having at its inner end a tubular extension, a washer surrounding said extension, a valve casing, a reciprocable valve plug in said casing having at each end thereof an annular projecting flange adapted to seat on said washer and form a cut-off therewith, means for connecting said valve casing to said valve connection, and a float lever adapted to engage the recess within the projecting flange upon that end of the plug which is remote from the valve seat, substantially as specified.

4. The combination with a tank, of a supply connection projecting thereinto and provided at its inner end with a valve seat, a valve casing, means for connecting said valve casing to said supply connection, a reciprocable valve plug in said casing having at each end thereof an annular projecting flange adapted to form a cut-off with the valve seat, and a float lever pivoted to the valve casing and having a projection adapted to engage that end of the valve plug which is remote from the seat and to increase the leverage of the float thereon as the float rises, substantially as specified.

5. The combination, with a tank, of a valve, said valve comprising a valve casing, a free plunger within said casing, said plunger being formed at both ends with a recess, a lever pivoted to the casing, said lever comprising a long and a short arm, a ball carried at the end of the long arm, and a screw threaded through the short arm bearing upon the valve plug within the recess.

6. The combination, with a tank, of a valve controlling the supply of liquid to said tank, said valve comprising a casing, a valve plug in said casing and adapted to move axially therein, said plug having its opposite ends provided with symmetrical recesses, a lever having a ball connected thereto and adapted to engage the adjacent end of the plug within the recess thereof, said lever being arranged to exert upon the plug a leverage which increases as the ball approaches its upper limit of movement, substantially as specified.

7. The combination, with a tank of a supply connection projecting into said tank and having its outer periphery provided with a thread and having a central tubular extension, a washer surrounding said tubular extension, a valve casing having a flange adapted to rest on said washer, a reciprocable valve plug in said casing adapted to seat on said washer, and a union member having an internal thread and an inwardly projecting flange adapted to engage the flange on the valve casing to connect said casing with the supply connection, substantially as specified.

8. The combination, with a tank, of a supply connection projecting thereinto and provided at its end with a seat, said connection being provided with a central flange constituting an extension of the bore thereof, a washer having a central aperture and seated on the end of said connection with said aperture surrounding said flange, a valve comprising a casing having one end provided with an outwardly projecting flange, said end projecting inwardly to form a bearing on said washer, said connection having a thread thereon, and a union member having a shoulder adapted to engage the external flange on the casing, and an internal thread adapted to engage the thread on the connection.

9. The combination with a tank, of a supply connection projecting thereinto and having at its inner end a tubular extension, a washer surrounding said extension, a valve casing carried by said connection, a reciprocable valve plug in said casing, said valve plug being formed at its opposite ends with a projecting annular flange adapted to seat upon the washer and form a cut-off therewith, and a float lever mechanism operatively connected with said valve plug.

In testimony whereof, I hereunto affix my signature in the presence of two witnesses.

GEORGE E. VAN DEUSEN.

Witnesses:
J. B. HULL,
G. A. MYERS.